United States Patent
Hareyama et al.

(10) Patent No.: US 6,713,164 B1
(45) Date of Patent: Mar. 30, 2004

(54) PRINTING SHEETS

(75) Inventors: Yukiya Hareyama, Tokushima (JP); Hidetoshi Ogawa, Tokushima (JP)

(73) Assignee: Otsuka Kagaku Kabushiki Kaisha, Osaka (JP)

( * ) Notice: Subject to any disclaimer, the term of this patent is extended or adjusted under 35 U.S.C. 154(b) by 0 days.

(21) Appl. No.: 09/445,421

(22) PCT Filed: Dec. 25, 1997

(86) PCT No.: PCT/JP97/04808

§ 371 (c)(1), (2), (4) Date: Dec. 10, 1999

(87) PCT Pub. No.: WO99/10418

PCT Pub. Date: Mar. 4, 1999

(30) Foreign Application Priority Data

Aug. 27, 1997 (JP) ............................................. 9-247901

(51) Int. Cl.⁷ ........................... B32B 15/00; B32B 9/00; H01B 1/02
(52) U.S. Cl. ...................... 428/211; 428/389; 428/367; 252/520
(58) Field of Search ................................ 428/211, 389, 428/367; 252/520

(56) References Cited

U.S. PATENT DOCUMENTS 4,554,094 A * 11/1985 Babler et al. ............... 252/518
4,904,636 A    2/1990 Hayashi et al. ............. 503/207
4,933,109 A    6/1990 Yamada et al. ............. 252/520
6,101,362 A *  8/2000 Shimura et al. ............ 399/329

FOREIGN PATENT DOCUMENTS

EP  267535     5/1988
EP  586846     3/1994
EP  0 696 615  2/1996
WO  91/05668   5/1991

OTHER PUBLICATIONS

English Abstract of JP–A–09–059,427—Haruyama et al.
Patent Abstracts of Japan, Publication No. 61136532, published Jun. 24, 1986.
Database WPI, Section Ch, Week 199517, JP 07 052526 dated Feb. 28, 1995.

* cited by examiner

Primary Examiner—Cynthia H. Kelly
Assistant Examiner—L. Ferguson
(74) Attorney, Agent, or Firm—Rothwell, Figg, Ernst & Manbeck, P.C.

(57) ABSTRACT

A printing sheet shaped from a resin containing 5 to 80 wt. % of a fibrous electrically conductive filler less than 100 Ω·cm in volume resistivity, having 3 to 50 $\mu$m in average fiber length, 0.01 to 5 $\mu$m in average fiber diameter and 3 to 100 in aspect ratio and having a surface coated with an electrically conductive layer containing at least a tin oxide and an antimony oxide, or a printing sheet comprising a film substrate and a covering layer formed on at least one surface of the substrate and comprising a resin containing the above conductive filler.

16 Claims, No Drawings

PRINTING SHEETS

CROSS-REFERRENCE TO RELATED APPLICATIONS

This application is a §371 of International PCT Application Ser. No. PCT/JP97/04808, filed Dec. 25, 1997, which claims priority from Japanese application No. 247,901/1997, filed Aug. 27, 1997.

TECHNICAL FIELD

The present invention relates to printing sheets suitable for use as paper currency, securities, admission tickets, etc.

BACKGROUND ART

Attempts have been made in recent years to use bills made by printing a resin film as substitutes for conventional paper currency. (The term "bill" as used herein includes paper currency and currency made from a resin sheet.) As compared with the conventional paper currency, these bills have the advantage of being superior in durability, water resistance and prevention of counterfeiting.

However, resins generally have the drawbacks of being readily chargeable and difficult to print because of low wettability with ink. Resin films are liable to electrostatically adhere to one another during circulation and therefore difficult to count up or identify by machines, and further have the problem that bills of such film are difficult to count up manually since they are devoid of suitable surface roughness required of bills.

An object of the present invention is to provide printing resin sheets which are free of all the problems including charging and which feel like paper currency.

DISCLOSURE OF THE INVENTION

The present invention provides a printing sheet shaped from a resin containing 5 to 80 wt. % of a fibrous electrically conductive filler less than 100 $\Omega \cdot cm$ in volume resistivity, having 3 to 50 $\mu m$ in average fiber length, 0.01 to 5 $\mu m$ in average fiber diameter and 3 to 100 in aspect ratio and having a surface coated with an electrically conductive layer containing at least a tin oxide and an antimony oxide.

The present invention further provides a printing sheet comprising a film substrate and a covering layer formed on at least one surface of the substrate and comprising a resin containing the above-mentioned conductive filler.

We have conducted intensive research in view of the foregoing problems and consequently found that a sheet feeling like paper currency and free of any of the problems such as charging can be realized by using a resin having a fibrous material of specific shape incorporated therein. This finding has matured to the present invention.

The fibrous conductive filler for use in the invention comprises a core material, for which various inorganic or organic fibrous materials of specified shape are usable. Examples of such materials usable are potassium tetratitanate fiber, potassium hexatitanate fiber, potassium octatitanate fiber, titania fiber, monoclinic titania fiber, aluminum borate fiber, magnesium borate fiber, alumina fiber, wollastonite, xonotlite, silicon nitride fiber, boron fiber, boron fiber, glass fiber, siliceous fiber, carbon fiber, cellulose fiber, polyester fiber and polyamide fiber. Among these, monoclinic titania fiber and potassium hexatitanate fiber are especially suited for fulfilling the object of the invention since these fibers have the feature of being relatively small in hiding power, therefore permit watermarking, and are further useful for reinforcing the resulting sheet.

The fibrous conductive filler for use in the present invention comprises such a fibrous core material and a conductive layer formed thereon and containing at least a tin oxide and an antimony oxide. The conductive layer containing these oxides is suited to the contemplated use since the layer has high conductivity and is white. Although the method of covering the core material with the conductive layer is not limited specifically, it is desirable, for example, to simultaneously add an alkali and a hydrochloric acid solution of tin oxide and antimony oxide dropwise to a slurry of the core material to effect coprecipitation. While the amount of coating is suitably determined so that the resulting filler has a volume resistivity of less than 100 $\Omega \cdot cm$, preferably $10^{-2}$ to 10 $\Omega \cdot cm$, usually used for coating are 5 to 100 parts by weight of tin oxide and 0.01 to 10 parts by weight of antimony oxide per 100 parts by weight of the core material. In addition to these oxides, an indium oxide, a cobalt oxide, etc. are also usable suitably. In this case, each or one of the additional oxides is used in an amount of about 0.01 to about 10 parts by weight per 100 parts by weight of the core material.

These methods are disclosed in detail in JP-B-26933/1986, JP-B-4328/1987, JP-B-23221/1995, JP-B-54644/1995, JP-A-170860/1990, etc. Such fillers are commercially available under the brand names of "Dentall WK300," and "Dentall WK500" (both products of OTSUKA KAGAKU KABUSHIKI KAISHA).

The printing resin sheet of the invention can be prepared either by incorporating the fibrous conductive filler into a film substrate itself (claim 1), or by forming a covering layer containing the fibrous conductive filler on one or each of opposite surfaces of a film substrate (claim 2).

When the fibrous conductive filler is to be incorporated into a resin sheet itself, a resin and the fibrous conductive filler are mixed together by dry blending or by melting and kneading, and the mixture is formed into a sheet as by extrusion in a molten state, biaxial orientation, calendering or casting.

The resin to be used is not limited specifically, but various resins are usable which can be made into a film or sheet. Specific examples of resins to be used are polyethylene resin, polypropylene resin and like polyolefin resins, polyethylene terephthalate resin, aramid resin, polyamide resin, polyetheretherketone resin, polyetherimide resin, polyimide resin, etc.

The proportion of the fibrous conductive filler relative to the resin can be suitably determined that the resulting sheet will have surface resistance in the range of 10 to $10^{10}$ $\Omega$ and retain flexibility without impairment. The filler is used usually in a proportion of about 5 to about 80 wt. %, preferably about 10 to about 40 wt. %, of the combined amount of the resin and the filler.

When a covering layer containing the fibrous conductive filler is to be formed on a surface of a resin sheet (film substrate), a resin composition prepared by admixing the filler with a binder resin is first formed into a sheet, which is then laminated to the film substrate. Alternatively, such a resin composition, which is not cured and wherein the binder resin is a curable resin, is applied to the film substrate surface, and the coating is cured by heating and drying or by irradiation with ultraviolet rays.

Examples of binder resins usable are olefin resin, melamine resin, urea resin, acrylic resin, urethane resin, silicone resin and phenolic resin. The filler is used usually in a proportion of about 5 to about 80 wt. %, preferably about 20 to about 50 wt. %, of the combined amount of the resin and the filler.

In preparing the printing resin sheet of the invention, various methods are usable for the prevention of counterfeiting which include, for example, sandwiching metal tape yarns between the components of the sheet, or incorporating a magnetic material into the resin. Various inks are usable for printing the resin sheet obtained.

Examples of printing methods usable are flexographic printing, gravure printing, offset printing, screen printing and ink-jet printing.

BEST MODE OF CARRYING OUT THE INVENTION

The present invention will be described below in greater detail with reference to the following examples and comparative examples, in which the term "parts" means "parts by weight." The conductive fillers described below were used.

Conductive Filler A

A conductive filler comprising monoclinic titania fiber (core material), and a tin oxide (25 parts per 100 parts of the core material) and an antimony oxide (1 part per 100 parts of the core material) coating the surface of the fiber. Average fiber length 7 μm, average fiber diameter 0.2 μm and volume resistivity 1 Ω·cm.

Conductive Filler B

A conductive filler comprising potassium hexatitanate fiber (core material), and a tin oxide (25 parts per 100 parts of the core material) and an antimony oxide (1 part per 100 parts of the core material) coating the surface of the fiber. Average fiber length 15 μm, average fiber diameter 0.4 μm and volume resistivity 1 Ω·cm.

Conductive Filler C

A conductive filler comprising titania fiber (core material), and a tin oxide (25 parts per 100 parts of the core material) and an antimony oxide (1 part per 100 parts of the core material) coating the surface of the fiber. Average fiber length 4 μm, average fiber diameter 0.1 μm and volume resistivity 1 Ω·cm.

Conductive Filler D

A conductive filler comprising titania powder (core material), and a tin oxide (25 parts per 100 parts of the core material) and an antimony oxide (1 part per 100 parts of the core material) coating the surface of the powder. Average particle size 5 μm and volume resistivity 1 Ω·cm.

EXAMPLE 1

Polypropylene resin pellets were melted and kneaded in a twin-screw kneader. Conductive Filler A was charged in through a side hopper, and the mixture was extruded into a 100 μm-thick sheet, whereby a printing resin sheet of the invention was obtained. The resin sheet contained 30 wt. % of Conductive Filler A.

EXAMPLE 2

A printing resin sheet was prepared in the same manner as in Example 1 except that the filler was replaced by Conductive Filler B.

EXAMPLE 3

A printing resin sheet was prepared in the same manner as in Example 1 except that the filler was replaced by Conductive Filler C.

COMPARATIVE EXAMPLE 1

A printing resin sheet was prepared in the same manner as in Example 1 except that the filler was replaced by Conductive Filler D.

COMPARATIVE EXAMPLE 2

A printing resin sheet was prepared in the same manner as in Example 1 except that no filler was used.

EXAMPLE 4

To a solution-type (solvent-containing) urethane resin was added Conductive Filler B in an amount of 40 wt. % of the combined amount of the resin and the filler calculated as solids, and the mixture was thoroughly agitated, then applied to opposite surfaces of an 80-μm-thick polypropylene sheet and thereafter dried in a hot air stream for curing to obtain a 120-μm-thick printing resin sheet. The sheet felt like paper currency and was satisfactory in printability.

TEST EXAMPLE 1

The sheets obtained in Examples 1 to 3 and Comparative Examples 1 and 2 were checked for static breaking energy (kg·cm/cm$^3$). The results obtained were Example 2>Example 1>Example 3>>Comparative Example 1>Comparative Example 2.

Example 2 180, Example 1 171, Example 3 168, Comp. Ex. 1 133, Comp. Ex. 2 120.

TEST EXAMPLE 2

The sheets obtained in Examples 1 to 3 and Comparative Examples 1 and 2 were checked for surface resistance value (ASTM D257) with the following results.

Example 1: $3.0 \times 10^8$ Ω, Example 2: $5.0 \times 10^7$ Ω. Example 3: $3.0 \times 10^8$ Ω, Comparative Example 1: $3.0 \times 10^{10}$ Ω, Comparative Example 2: $4.0 \times 10^{15}$ Ω.

TEST EXAMPLE 3

The sheets obtained in Examples 1 to 3 and Comparative Examples 1 and 2 were checked for surface smoothness (Ra, average surface smoothness, μm). The results obtained were Comparative Example 2<<Example 2 Example 1 Example 3<Comparative Example 1.

Comp. Ex. 2 0.10 μm, Example 2 0.30 μm, Example 1 0.28 μm, Example 3 0.32 μm, Comp. Ex. 1 0.62 μm.

INDUSTRIAL APPLICABILITY

The printing resin sheet of the present invention is shaped from a conductive resin composition containing a fibrous material of specified shape, is therefore given a feel resembling that of paper currency, has improved tear strength, and is prevented from charging and extremely convenient for printing and handling. The sheet further has the advantage of being less prone to cause troubles such as jams when mechanically handled as by vending machines or automated teller machines (ATMs).

What is claimed is:

1. A currency bill comprising a printing sheet comprising a resin containing 5 to 80 wt % of a fibrous electrically conductive filler which has (1) a volume resistivity of less than 100 Ω·cm, (2) an average fiber length of 3–50 μm, (3) an average fiber diameter of 0.01 to 5 μm, (4) an aspect ratio of 3 to 100 and (5) a surface coated with an electrically conductive layer containing at least a tin oxide and an antimony oxide, wherein the printing sheet is uncharged, with printing on at least one side of said printing sheet.

2. A currency bill as in claim 1 with printing on at both sides of said printing sheet.

3. The currency bill of claim 1, wherein the fibrous electrically conductive filler contains tin oxide in an amount of 5–100 parts by weight and antimony oxide in an amount of 0.01–10 parts by weight per 100 parts by weight of fibers of the fibrous electrically conductive filler.

4. The currency bill of claim 1, wherein the fibrous electrically conductive filler contains indium oxide and cobalt oxide in the amount of 0.01–10 parts by weight per 100 parts by weight of the fibrous electrically conductive filler.

5. A security comprising a printing sheet comprising a resin containing 5 to 80 wt % of a fibrous electrically conductive filler which has (1) a volume resistivity of less than 100 $\Omega \cdot cm$, (2) an average fiber length of 3–50 $\mu m$, (3) an average fiber diameter of 0.01 to 5 $\mu m$, (4) an aspect ratio of 3 to 100 and (5) a surface coated with an electrically conductive layer containing at least a tin oxide and an antimony oxide, with printing on at least one side of said printing sheet.

6. The security of claim 5, wherein the fibrous electrically conductive filler contains tin oxide in an amount of 5–100 parts by weight and antimony oxide in an amount of 0.01–10 parts by weight per 100 parts by weight of fibers of the fibrous electrically conductive filler.

7. The security of claim 5, wherein the fibrous electrically conductive filler contains indium oxide and cobalt oxide in the amount of 0.01–10 parts by weight per 100 parts by weight of the fibrous electrically conductive filler.

8. An admission ticket comprising a printing sheet comprising a resin containing 5 to 80 wt % of a fibrous electrically conductive filler which has (1) a volume resistivity of less than 100 $\Omega \cdot cm$, (2) an average fiber length of 3–50 $\mu m$, (3) an average fiber diameter of 0.01 to 5 $\mu m$, (4) an aspect ratio of 3 to 100 and (5) a surface coated with an electrically conductive layer containing at least a tin oxide and an antimony oxide, with printing on at least one side of said printing sheet.

9. The admission ticket of claim 8, wherein the fibrous electrically conductive filler contains tin oxide in an amount of 5–100 parts by weight and antimony oxide in an amount of 0.01–10 parts by weight per 100 parts by weight of fibers of the fibrous electrically conductive filler.

10. The admission ticket of claim 8, wherein the fibrous electrically conductive filler contains indium oxide and cobalt oxide in the amount of 0.01–10 parts by weight per 100 parts by weight of the fibrous electrically conductive filler.

11. A currency bill comprising a printing sheet made from a resin containing 5 to 80 wt % of a fibrous electrically conductive filler which has (1) a volume resistivity of less than 100 $\Omega \cdot cm$, (2) an average fiber length of 3–50 $\mu m$, (3) an average fiber diameter of 0.01 to 5 $\mu m$, (4) an aspect ratio of 3 to 100 and (5) a surface coated with an electrically conductive layer containing at least a tin oxide and an antimony oxide, wherein the printing sheet is uncharged with printing on at least one side of said printing sheet.

12. A security comprising a printing sheet made from a resin containing 5 to 80 wt % of a fibrous electrically conductive filler which has (1) a volume resistivity of less than 100 $\Omega \cdot cm$, (2) an average fiber length of 3–50 $\mu m$, (3) an average fiber diameter of 0.01 to 5 $\mu m$, (4) an aspect ratio of 3 to 100 and (5) a surface coated with an electrically conductive layer containing at least a tin oxide and an antimony oxide, wherein the printing sheet is uncharged, with printing on at least one side of said printing sheet.

13. An admission ticket comprising a printing sheet made from a resin containing 5 to 80 wt % of a fibrous electrically conductive filler which has (1) a volume resistivity of less than 100 $\Omega \cdot cm$, (2) an average fiber length of 3–50 $\mu m$, (3) an average fiber diameter of 0.01 to 5 $\mu m$, (4) an aspect ratio of 3 to 100 and (5) a surface coated with an electrically conductive layer containing at least a tin oxide and an antimony oxide, wherein the printing sheet is uncharged, with printing on at least one side of said printing sheet.

14. A currency bill consisting essentially of a printing sheet made from a resin containing 5 to 80 wt % of a fibrous electrically conductive filler which has (1) a volume resistivity of less than 100 $\Omega \cdot cm$, (2) an average fiber length of 3–50 $\mu m$, (3) an average fiber diameter of 0.01 to 5 $\mu m$, (4) an aspect ratio of 3 to 100 and (5) a surface coated with an electrically conductive layer containing at least a tin oxide and an antimony oxide, wherein the printing sheet is uncharged with printing on both sides of said printing sheet.

15. A security consisting essentially of a printing sheet made from a resin containing 5 to 80 wt % of a fibrous electrically conductive filler which has (1) a volume resistivity of less than 100 $\Omega \cdot cm$, (2) an average fiber length of 3–50 $\mu m$, (3) an average fiber diameter of 0.01 to 5 $\mu m$, (4) an aspect ratio of 3 to 100 and (5) a surface coated with an electrically conductive layer containing at least a tin oxide and an antimony oxide, wherein the printing sheet is uncharged with printing on at least one side of said printing sheet.

16. An admission ticket consisting essentially of a printing sheet made from a resin containing 5 to 80 wt % of a fibrous electrically conductive filler which has (1) a volume resistivity of less than 100 $\Omega \cdot cm$, (2) an average fiber length of 3–50 $\mu m$, (3) an average fiber diameter of 0.01 to 5 $\mu m$, (4) an aspect ratio of 3 to 100 and (5) a surface coated with an electrically conductive layer containing at least a tin oxide and an antimony oxide, wherein the printing sheet is uncharged, with and printing on at least one side of said printing sheet.

\* \* \* \* \*